United States Patent
Imoto et al.

(10) Patent No.: US 9,498,771 B2
(45) Date of Patent: *Nov. 22, 2016

(54) CATALYST FOR EXHAUST GAS PURIFICATION, AND METHOD FOR PRODUCING SAME

(71) Applicants: Rui Imoto, Susono (JP); Daichi Sato, Susono (JP); Satoshi Nagao, Gotenba (JP); Masaya Ibe, Tokyo (JP)

(72) Inventors: Rui Imoto, Susono (JP); Daichi Sato, Susono (JP); Satoshi Nagao, Gotenba (JP); Masaya Ibe, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/421,061

(22) PCT Filed: Sep. 6, 2013

(86) PCT No.: PCT/JP2013/074138
§ 371 (c)(1),
(2) Date: Feb. 11, 2015

(87) PCT Pub. No.: WO2014/042099
PCT Pub. Date: Mar. 20, 2014

(65) Prior Publication Data
US 2015/0217280 A1 Aug. 6, 2015

(30) Foreign Application Priority Data

Sep. 12, 2012 (JP) ................................. 2012-200629

(51) Int. Cl.
*B01J 23/42* (2006.01)
*B01J 27/18* (2006.01)
(Continued)

(52) U.S. Cl.
CPC ................ *B01J 27/16* (2013.01); *B01D 53/94* (2013.01); *B01D 53/945* (2013.01); *B01J 23/40* (2013.01);
(Continued)

(58) Field of Classification Search
CPC ........ B01J 23/42; B01J 23/44; B01J 23/464; B01J 27/14; B01J 27/16; B01J 27/18; B01J 37/00; B01J 37/0217; B01J 37/08; B01D 53/56; B01D 56/86; B01D 53/8625; B01D 53/8628; B01D 53/94; B01D 53/9413
USPC ........................................ 502/213; 423/239.1
See application file for complete search history.

(56) References Cited

U.S. PATENT DOCUMENTS 5,260,241 A * 11/1993 Addiego .................. B01J 23/40
502/208
5,736,114 A * 4/1998 Barthe ............... B01D 53/9418
423/213.2

(Continued)

FOREIGN PATENT DOCUMENTS

| EP | 2896455 A1 | 7/2015 |
|---|---|---|
| JP | H04-334526 A | 11/1992 |

(Continued)

OTHER PUBLICATIONS

Machida et al., "AlPO4 as a Support Capable of Minimizing Threshold Loading of Rh in Automotive Catalysts," Chem. Mater., 2009, vol. 21, pp. 1796-1798.

(Continued)

*Primary Examiner* — Patricia L Hailey
(74) *Attorney, Agent, or Firm* — Oliff PLC

(57) ABSTRACT

To provide an exhaust gas catalyst using a fired aluminum phosphate body with more excellent performance, and a method for producing it. (1) An exhaust gas purification catalyst including at least one platinum-group metal selected from the group consisting of Pt, Rh and Pd having a mean particle diameter of between 0.50 nm and 2.0 nm, supported on a tridymite-type fired aluminum phosphate body. (2) A method for producing an exhaust gas purification catalyst, including the steps of: firing aluminum phosphate obtained from an aqueous solution prepared to a pH of 3.5 to 4.5, at a temperature of between 1000° C. and 1200° C. for 2 hours or longer, to obtain a fired aluminum phosphate body, and supporting at least one type of platinum-group metal selected from the group consisting of Pt, Rh and Pd on the fired aluminum phosphate body.

6 Claims, 2 Drawing Sheets

(51) Int. Cl.
 B01J 37/00 (2006.01)
 B01D 53/56 (2006.01)
 B01D 53/94 (2006.01)
 B01J 27/16 (2006.01)
 B01J 23/40 (2006.01)
 B01J 23/44 (2006.01)
 B01J 29/83 (2006.01)
 B01J 35/00 (2006.01)
 B01J 35/02 (2006.01)
 B01J 37/02 (2006.01)
 B01J 37/08 (2006.01)
 B01J 23/46 (2006.01)
 B01J 27/185 (2006.01)
(52) U.S. Cl.
 CPC ........... *B01J 23/42* (2013.01); *B01J 23/44* (2013.01); *B01J 23/464* (2013.01); *B01J 27/1856* (2013.01); *B01J 29/83* (2013.01); *B01J 35/002* (2013.01); *B01J 35/006* (2013.01); *B01J 35/0006* (2013.01); *B01J 35/0066* (2013.01); *B01J 35/023* (2013.01); *B01J 37/0063* (2013.01); *B01J 37/0201* (2013.01); *B01J 37/0211* (2013.01); *B01J 37/08* (2013.01); *B01D 2255/1023* (2013.01); *B01D 2255/2092* (2013.01); *B01D 2255/9202* (2013.01); *Y02T 10/22* (2013.01)

(56) References Cited

U.S. PATENT DOCUMENTS 9,067,193 B2 * 6/2015 Nagao .................. B01D 53/945

2014/0221198 A1 * 8/2014 Nagao .................. B01J 27/1804
 502/213
2014/0336042 A1 11/2014 Nagao et al.

FOREIGN PATENT DOCUMENTS

| JP | H07-068178 A | 3/1995 | |
|---|---|---|---|
| JP | 2009-018287 A | 1/2009 | |
| JP | 4505046 B2 | 7/2010 | |
| JP | 2012154347 A | 8/2012 | |
| JP | 2013132580 A | 7/2013 | |
| JP | 2014-008456 A | 1/2014 | |
| JP | 2014-033992 A | 2/2014 | |
| JP | 2014-113580 A | 6/2014 | |
| JP | 2014-121666 A | 7/2014 | |
| WO | 2009142180 A1 | 11/2009 | |
| WO | 2013/099706 * | 7/2013 | ............ B01J 27/185 |

OTHER PUBLICATIONS

Ikeue et al., "Thermostable Rh Catalysts Supported on Metal Phosphates Effect of Aging on Catalytic Activity for NO—CO—C3H6—O2 Reactions," Bull. Chem. Soc. Jpn., 2010, vol. 83, No. 3, pp. 291-297.

R. Fujii et al., "High Activityof Pt/AlPO4 Catalyst for Selective Catalytic Reduction of Nitrogen Monoxide by Propene in Excess Oxygen," Chemistry Letters, vol. 32, No. 8, pp. 764-765, Jul. 28, 2003.

B. L. Newalkar et al., "The effect of gel pH on the crystallization of aluminophosphate molecular sieve AlPO4-5," Zeolites Elsevier Science Publishing, vol. 18, No. 4, pp. 286-290, Apr. 1, 1997.

* cited by examiner

Activity evaluation pattern

Pd/AlPO₄ NOx purification activity

NOx purification activity after heat durability treatment

Pd particle diameter after heat durability treatment

Pd particle diameter (crystallite diameter) after heat durability treatment

Carrier oxygen ion electron density

CATALYST FOR EXHAUST GAS PURIFICATION, AND METHOD FOR PRODUCING SAME

TECHNICAL FIELD

The present invention relates to an exhaust gas purification catalyst and to a method for producing it, and more particularly it relates to a platinum-group metal- and base metal-supporting aluminum phosphate catalyst for exhaust gas purification, such as a platinum-group metal- and base metal-supporting aluminum phosphate catalyst that purifies noxious components in exhaust gas that is discharged from internal combustion engines of automobiles and the like, as well as a method for producing it.

BACKGROUND ART

In recent years, worldwide restrictions on exhaust gas are becoming tighter from the viewpoint of environmental protection.

Exhaust gas purification catalysts are being employed in internal combustion engines as one measure. In order to efficiently purify the hydrocarbons (hereunder abbreviated as "HC"), CO and nitrogen oxides in exhaust gas, exhaust gas purification catalysts employ a variety of catalysts, including platinum-group elements such as Pt, Pd and Rh, as catalyst components.

PTL 1 describes an exhaust gas purification catalyst comprising a heat-resistant $AlPO_4$ compound having a tridymite-type crystal structure and a BET specific surface area of 50-150 $m^2/g$, and at least one type of precious metal component selected from the group consisting of Pt, Pd and Rh, supported on the $AlPO_4$ compound (claim 1 of PTL 1).

CITATION LIST

Patent Literature

[PTL 1] Japanese Patent Publication No. 4,505,046

DISCLOSURE OF THE INVENTION

Problems to be Solved by the Invention

There is a demand for an exhaust gas purification catalyst that reduces the amount of precious metal in the exhaust gas purification catalyst and that is resistant to deterioration by heat emitted from engines and by the sulfur components in fuels. For greater suitability for exhaust gas purification, it is necessary to use an exhaust gas purification apparatus that can also satisfactorily remove such components even under conditions with low exhaust gas temperature, such as during engine start-up or low-speed operation.

With the activity of Pd-supporting $AlPO_4$ catalysts known in the prior art after heat-resistant treatment, Pd grain growth proceeds or lower activity is exhibited than other conventional catalysts, depending on the mean particle diameter of the Pd supported in chemical solution, and there has consequently been a need for improvement in order to increase activity.

Means for Solving the Problems

As a result of diligent efforts, the present inventors have found that in a catalyst comprising a platinum-group metal supported on an $AlPO_4$ carrier having a tridymite-type crystal structure, the problem described above can be solved and it is possible to obtain very excellent results if the mean particle diameter of the platinum-group metal is controlled during catalyst production.

The modes of the present invention are as follows.

(1) An exhaust gas purification catalyst comprising at least one platinum-group metal selected from the group consisting of Pt, Rh and Pd having a mean particle diameter of between 0.50 nm and 2.0 nm, supported on a tridymite-type aluminum phosphate fired body.

(2) An exhaust gas purification catalyst according to (1), wherein the platinum-group metal is Pd.

(3) An exhaust gas purification catalyst according to (1) or (2), wherein the loading weight of the platinum-group metal with respect to the fired body is 0.0001 wt % to 2.0 wt %.

(4) A method for producing an exhaust gas purification catalyst, comprising the steps of:

firing aluminum phosphate obtained from an aqueous solution prepared to a pH of 3.5 to 4.5, at a temperature of between 1000° C. and 1200° C. for 2 hours or longer, to obtain a fired aluminum phosphate body, and supporting at least one type of platinum-group metal selected from the group consisting of Pt, Rh and Pd on the fired aluminum phosphate body.

(5) The method for producing an exhaust gas purification catalyst according to (4), wherein the platinum-group metal is Pd.

(6) The method for producing an exhaust gas purification catalyst according to (4) or (5), wherein the loading weight of the platinum-group metal with respect to the fired body is 0.0001 wt % to 2.0 wt %.

Effect of the Invention

The exhaust gas purification catalyst relating to the invention can reduce the amount of precious metal in the exhaust gas purification catalyst while bringing out the performance of excellent heat resistance against heat emitted from the engine and reduction in toxicity of the sulfur in the aluminum phosphate, and not only exhibiting very excellent catalytic activity at low temperature but also exhibiting higher activity than conventional catalysts, even after heat durability treatment.

BEST MODE FOR CARRYING OUT THE INVENTION

Figure 1:
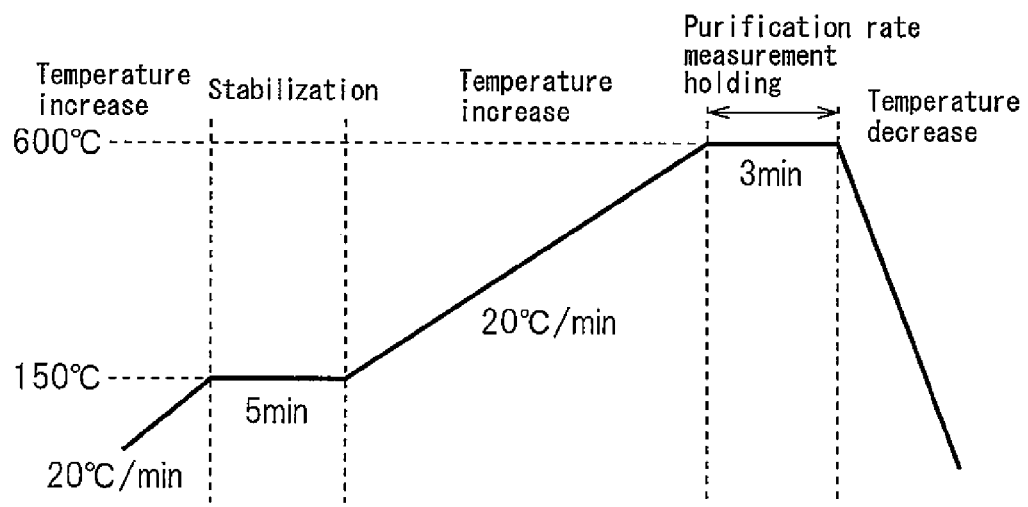
FIG. 1 is a graph showing a temperature increase pattern for evaluation of catalyst activity.

Throughout the present specification, references using names of the inorganic material compounds or ratios of metals present (instances provided below), which are produced so as to have those compositions, include compositions that when actually produced contain impurities and the like. Thus, a reference using the name of an inorganic material compound or ratio of metals present include inorganic compounds having in the structure of the inorganic compound a composition with an excess or deficiency of ±1 atoms of elements such as oxygen, hydrogen and nitrogen in the chemical formula; or in the case of aluminum phosphate, for example, $AlPO_4$ includes compounds $AlPO_2$ to $AlPO_5$ having ±1 oxygen atoms, and compounds having an Al/P ratio of 1±about 0.3, as well as those having hydrogen as an impurity, which are not represented by the compound formula.

The fired aluminum phosphate body relating to the invention has a tridymite-type crystal structure. However, this can also include berlinite-type crystal structures, cristobalite-type crystal structures and amorphous forms, in addition to a tridymite-type crystal structure.

The fired aluminum phosphate body used for the invention may be a fired aluminum phosphate body obtained by any known method, without any particular restrictions.

There are no particular restrictions on the method for producing the fired aluminum phosphate body, and any known method, such as neutralization, may be employed. For example, there may be mentioned a method of adding an aqueous solution of phosphoric acid to an aqueous solution of an Al-containing compound so that the molar ratio of P with respect to Al is essentially equal, adding ammonia water to adjust the pH, and separating and drying the resultant precipitate and subsequently firing it at the aforementioned firing temperature. Examples for the Al-containing compound include metal salts such as hydroxides and nitrates, and specifically $Al(OH)_3$ and $Al(NO_3)_3$.

The solvent used for the mixed solution containing the aluminum salt and phosphoric acid may be any desired solvent that is capable of dissolving the aluminum-containing compound and phosphoric acid, and for example, an aqueous solvent such as water or an organic solvent may be used.

The fired aluminum phosphate body relating to the invention may have a tridymite-type crystal structure, and for example, it may be one obtained by a wide variety of methods including:

(a) a method in which aluminum phosphate obtained from an aluminum phosphate aqueous solution with a prescribed pH is fired for a prescribed period of time at a prescribed temperature, (b) a method in which during production of a fired aluminum phosphate body, an excess of phosphate ion is added with respect to the aluminum ion, to produce residue of the unreacted phosphate ion in the product, and (c) a method in which a foaming agent, such as a thermoplastic resin such as an olefin-based resin or a thermoplastic resin such as a phenol-based resin, having a diameter that can produce the prescribed pore sizes, is mixed with the starting material for production of the fired aluminum phosphate body, and the foaming agent is burned off in the firing step.

Here, the aqueous solution pH, firing temperature and firing time during production of the aluminum phosphate in (a) above are not particularly restricted so long as there is no adverse effect on the tridymite-type crystal structure, and commonly employed conditions may be used, with respective ranges of about 3.0 to about 10.0, about between 1000° C. and 1200° C. and about 1 hour to about 10 hours.

The purification catalyst relating to the invention has at least one type of platinum-group metal selected from the group consisting of platinum (Pt), rhodium (Rh) and palladium (Pd) supported on the fired aluminum phosphate body. The mode of support is not particularly restricted, and it is sufficient if the platinum-group metal is supported on the fired body in a generally uniform manner.

The mean particle diameter of the supported platinum-group metal nanoparticles may be about 0.40 nm or greater, about 0.50 nm or greater, about 0.60 nm or greater, about 0.70 nm or greater, about 0.80 nm or greater, about 0.90 nm or greater or about 1.0 nm or greater, and about 2.2 nm or smaller, about 2.1 nm or smaller, about 2.0 nm or smaller, about 1.9 nm or smaller, about 1.8 nm or smaller, about 1.7 nm or smaller, about 1.6 nm or smaller, about 1.5 nm or smaller, about 1.4 nm or smaller, about 1.3 nm or smaller, about 1.2 nm or smaller or about 1.1 nm or smaller.

Among these ranges, it is preferably about 0.50 nm or greater and about 2.0 nm or smaller.

The amount of platinum-group metal with respect to the fired aluminum phosphate body may be about 0.0001 wt % or more, about 0.001 wt % or more, about 0.01 wt % or more, about 0.1 wt % or more, about 0.20 wt % or more or about 0.30 wt % or more, and about 2.0 wt % or less, about 1.9 wt % or less, about 1.8 wt % or less, about 1.7 wt % or less, about 1.6 wt % or less, about 1.5 wt % or less, about 1.4 wt % or less, about 1.3 wt % or less, about 1.2 wt % or less, about 1.1 wt % or less, about 1.0 wt % or less, about 0.90 wt % or less, about 0.80 wt % or less, about 0.70 wt % or less, about 0.60 wt % or less, about 0.50 wt % or less or about 0.40 wt % or less.

The mode of support is not particularly restricted, and it is sufficient if the platinum-group metal is supported on the carrier of the fired body in a generally uniform manner.

The method of supporting the platinum-group metal nanoparticles on the fired aluminum phosphate body is not particularly restricted so long as it does not adversely affect the fired aluminum phosphate body, and it may be a common method such as impregnation or surface deposition.

In order for the particle diameters of the platinum-group metal nanoparticles to be rendered uniform, a platinum-group metal colloid may be used, that can provide platinum-group metal particles of the desired particle diameter. There may also be used another platinum-group metal source, such as a platinum acetate-based metal compound, platinum nitrate-based metal compound or platinum chloride-based metal compound, or platinum-group metal nanoparticles synthesized from these. However, aluminum phosphate preferably does not contain nitrate ion or chloride ion because it is readily soluble in strong acids.

Figure 2:
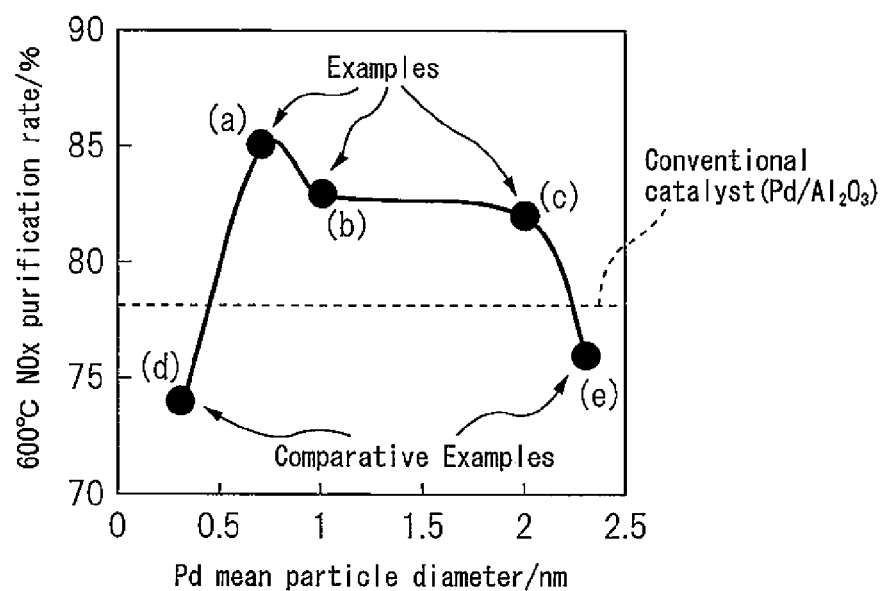
FIG. 2 is a graph plotting NOx purification properties, i.e. the measured NOx gas purification rates after heat durability treatment for different samples having different mean particle diameters for Pd in a Pd-supporting $AlPO_4$ catalyst immediately after production ((a) Example 1: 0.70 nm, (b) Example 2: 1.0 nm, (c) Example 3: 2.0 nm, (d) Comparative Example 1: 0.3 nm, (e) Comparative Example 2: 2.3 nm), with respect to the mean particle diameters (nm) of the Pd particles immediately after production.

Using a catalyst relating to the invention, as shown in Examples 1 to 3 and the graph of FIG. 2, an $AlPO_4$ catalyst supporting Pd particles with a mean particle diameter of about 0.50 nm to about 2.0 nm by impregnation, exhibited more excellent purification power, with a purification rate exceeding 80% ((a) to (c) in FIG. 2), compared to a conventional catalyst (Pd-supporting $Al_2O_3$) ((d) and (e) in FIG. 2) exhibiting a purification rate of about 78%, for NOx at 600° C. even after heat durability treatment, and it was confirmed that there is an optimal particle diameter range for platinum-group metals with high activity.

Figure 3:
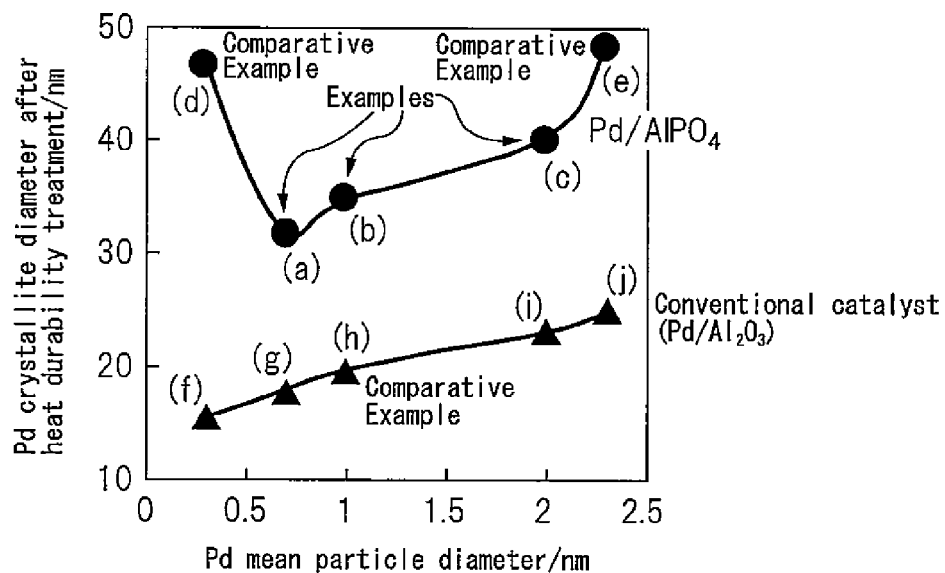
FIG. 3 is a graph plotting measured crystallite diameters (nm) of palladium after heat durability treatment for different samples having different mean particle diameters for Pd in a Pd-supporting $AlPO_4$ catalyst immediately after production ((a) Example 1: 0.70 nm, (b) Example 2: 1.0 nm, (c) Example 3: 2.0 nm, (d) Comparative Example 1: 0.3 nm, (e) Comparative Example 2: 2.3 nm), with respect to the mean particle diameters (nm) of the Pd particles immediately after production.

When the crystallite diameter after heat durability treatment was examined, as shown in Examples 1 to 3 and Comparative Examples 1 and 2, as well as the graph in FIG. 3, it was found that with an $AlPO_4$ catalyst supporting a platinum-group metal with particle diameters of less than about 0.50 nm and greater than about 2.0 nm by impregnation, the crystallite diameter significantly grew to exceed about 40 nm after heat durability treatment ((d) and (e) in FIG. 3), but with an $AlPO_4$ catalyst supporting platinum-group metal with particle diameters of about 0.50 nm or more and about 2.0 nm or smaller by impregnation ((a) to (c) in FIG. 3), growth of the crystallite diameters was limited to less than about 40 nm.

On the other hand, as seen in Comparative Examples 3 to 7 and the graph in FIG. 3, the crystallite diameter after heat durability treatment did not significantly grow with a Pd-supporting $Al_2O_3$ catalyst having particle diameters of about 10 nm to about 25 nm, as a conventional catalyst ((f) to (j) in FIG. 3).

Also, with a catalyst according to one mode of the invention, the crystallite diameter after heat durability treatment ((a) to (c) in FIG. 3) was increased compared to the conventional catalyst ((f) to (j) in FIG. 3), but a surprising result was obtained as the catalytic activity ((a) to (c) in FIG. 2) was higher than the conventional catalyst (dotted line in FIG. 2).

This demonstrated that, with a platinum-group metal-supporting $AlPO_4$ catalyst, the mean particle diameter of the platinum-group metal particles during catalyst production has a major effect on the activity of the catalyst after heat durability treatment, in contrast to a platinum-group metal-supporting $Al_2O_3$ catalyst as a conventional catalyst wherein the crystallite diameter of the platinum-group metal does not grow appreciably even after heat durability treatment. Furthermore, it was demonstrated that if the mean particle diameter of the platinum-group metal during production of the platinum-group metal-supporting $AlPO_4$ catalyst is between about 0.50 and about 2.0 nm, this not only inhibits growth of the crystallite diameter of the platinum-group metal and allows excellent purifying power of 80% or more to be exhibited for exhaust gases such as NOx, both before and after heat durability treatment, but it also results in much more excellent purifying power than conventional catalysts.

Figure 4:
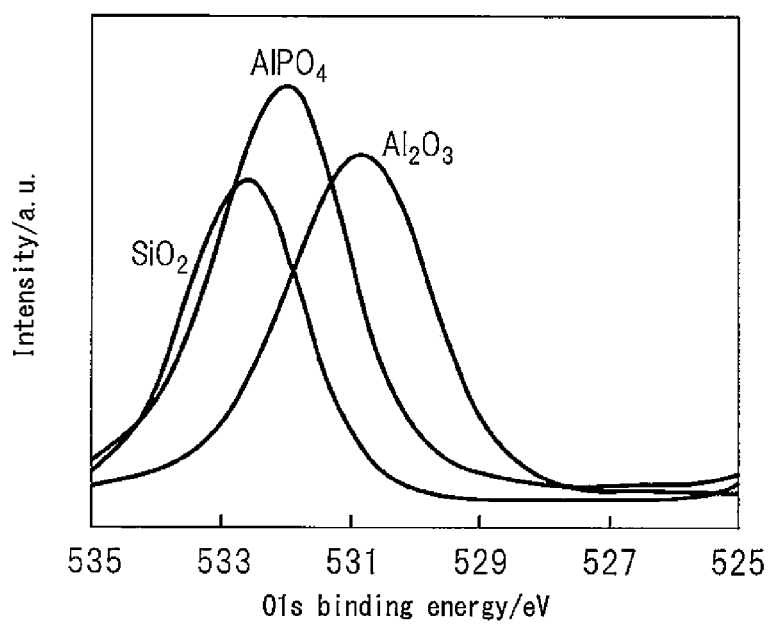
FIG. 4 is a graph plotting intensity of O1s with respect to binding energy (eV), for different samples of $SiO_2$, $AlPO_4$ and $Al_2O_3$.

When considering the oxygen ion electron density of the carrier (the is binding energy of O (oxygen) measured by XPS) (see FIG. 4), as a temporary indicator of interaction, the O1s binding energy of $AlPO_4$ is higher than the O1s binding energy of $Al_2O_3$, the property is acidic, and interaction is low.

While it is not our desire to be constrained by theory, it is believed that with an acidic carrier, such low interaction between the platinum-group metal and the carrier causes the platinum-group metal to migrate onto the carrier during heat durability treatment if the particle diameter of the platinum-group metal before heat durability treatment is too small, and the platinum-group metal particles fuse together, promoting grain growth. On the other hand, presumably when the mean particle diameter of the platinum-group metal before heat durability treatment is large, fusion tends to take place between neighboring platinum-group metal particles and grain growth and activity reduction result. Consequently, in an acidic carrier having low interaction with the platinum-group metal, such as $AlPO_4$, it is thought possible to minimize grain growth of the platinum-group metal after heat durability treatment and reduced activity due to grain growth, by loading a platinum-group metal with a suitable particle diameter.

EXAMPLES

The invention will now be explained in more specific detail by examples, with the understanding that the invention is in no way limited to the examples.

Synthesis Example 1

Synthesis of $AlPO_4$

Step 1-1: A 50 ml portion of ion-exchanged water was added to a beaker at room temperature, a stirrer was inserted and stirring was carried out.

Step 1-2: A 0.05 mol portion of aluminum nitrate nonahydrate (product of Nacalai Tesque, Inc.) was measured out and added to the ion-exchanged water, and dissolved therein while stirring.

Step 1-3: A 0.05 mol portion of 85 wt % phosphoric acid (product of Nacalai Tesque, Inc.), calculated as phosphoric acid, was measured out into a separate beaker and added to the water of step 1-2, and stirring was continued (the phosphoric acid remaining in the beaker was added to a liquid mixture beaker using ion-exchanged water).

Step 1-4: To the liquid mixture beaker there was gradually added dropwise 28 wt % ammonia water (product of Nacalai Tesque, Inc.) using a pipette, to adjust the pH to 4.3±0.3.

Step 1-5: The liquid mixture beaker was covered and stirred at room temperature for 12 hours.

Step 1-6: The liquid mixture was processed with a centrifugal separator (3000 rpm×10 minutes) and the precipitate and supernatant were separated.

Step 1-7: A suitable amount of ion-exchanged water was added to the precipitate, and the mixture was again processed with a centrifugal separator (washing step).

Step 1-8: The precipitate was dried for 12 hours with a dryer at 120° C.

Step 1-9: The dried product was placed in a mortar, and a pestle was used for pulverization to form a powder.

Step 1-10: The powder was fired in an electric furnace at 1100° C. for 5 hours to obtain approximately 6 g of powder.

Production Example 1

Production of Pd-Supporting Catalyst

Step 2-1: A 6 g portion of $AlPO_4$ powder was measured out at room temperature and placed in a beaker containing 30 ml of ion-exchanged water and a stirrer, and stirring was carried out.

Step 2-2: An aqueous solution of palladium nitrate with a Pd mean particle diameter of 0.7 nm was measured out to a Pd loading weight of 0.50 wt %, added to the beaker of step 2-1, and stirred.

Step 2-3: The beaker of step 2-2 was heated and stirred, and dried by evaporation until the moisture disappeared.

Step 2-4: The dried product of step 2-3 was dried for 12 hours in a dryer at 120° C.

Step 2-5: The dried product was placed in a mortar, and a pestle was used for pulverization to form a powder.

Step 2-6: The loaded powder was fired in an electric furnace at 500° C. for 3 hours.

Step 2-7: The fired powder was molded into pellets.

Example 1

A Pd-supporting $AlPO_4$ catalyst with a mean particle diameter of 0.70 nm was obtained by the procedure of <Synthesis Example 1> and <Production Example 1> above.

Examples 2 and 3

Catalyst powders (Examples 2 and 3) were obtained by the same procedure as (Example 1), except that instead of the aqueous solution of palladium nitrate in step 2-2, a colloid solution of palladium-pvp (mean particle diameter of Pd particles: 1.0 nm) (Example 2) and a colloid solution of palladium-pvp (mean particle diameter of Pd particles: 2.0 nm) (Example 3) were used.

Comparative Examples 1 and 2

Catalyst powders (Comparative Examples 1 and 2) were obtained by the same procedure as (Example 1), except that instead of the aqueous solution of palladium nitrate in step 2-2, an aqueous solution of palladium acetate (mean particle diameter of Pd particles: 0.30 nm) (Comparative Example 1) and a colloid solution of palladium-pvp (mean particle diameter of Pd particles: 2.3 nm) (Comparative Example 2) were used.

Comparative Examples 3 to 7

Catalyst powders (Comparative Examples 3 to 7) were obtained by the same procedure as Comparative Example 1 and Example 1, Example 2, Example 3 and Comparative Example 2, except that instead of using the $AlPO_4$ obtained in <Synthesis Example 1> as the carrier, there was used $Al_2O_3$ (product of Sasol, Ltd., 1.0 wt % $La_2O_3$-added $Al_2O_3$).
<Measurement of Pd Mean Particle Diameter after Production>

The mean particle diameters of the Pd particles were measured using an ELSZ-2 zeta potential/particle diameter measuring system (product of Otsuka Electronics Co., Ltd.) at room temperature, taking a sample of the Pd chemical solution or colloid aqueous solution as an aqueous solution of palladium nitrate or palladium acetate, and each value was recorded as the particle diameter for the 50% integrated value of the particle size distribution.
<Measurement of Pd Crystallite Diameter after Heat Durability Treatment>

The Pd crystallite diameter after heat durability treatment was measured using a RINT-TTRIII specimen horizontal high-power X-ray diffractometer (manufacturer: Rigaku Corp.).

The peak near $2\theta=40.0$ to $40.2°$ was used as the peak for Pd for calculation of the crystallite diameter.
(Catalyst Evaluation Method)

The catalyst powder was compression molded by applying 2 t of pressure, and was then pulverized and compression molded into pellets with diameters of about 2.5 mm to prepare an evaluation sample.
<Heat Durability Treatment>

Step 3-1: A 3 g portion of pellets was weighed out, and placed in an alumina reaction tube capable of addition of CO and $O_2$ gas and steam.

Step 3-2: The reaction tube was heated with an electric furnace, and 2 vol % CO (remainder: $N_2$) gas and 5 vol % $O_2$ (remainder: $N_2$) gas were alternately flowed into the reaction tube at 2 minute intervals. Steam was added to the gas at a constant 5 vol %. The gas volume was 10 L/min.

Step 3-3: The electric furnace was heated so that the temperature in the alumina reaction tube reached 1000° C., and this was maintained for 5 hours under a gas stream.
<Evaluation of Catalyst Activity>

Evaluation of the catalyst activity after heat durability treatment was carried out by measuring the purification rate using a gas-flow catalyst evaluator.

Each sample amount was 1.5 g.

The model gas used was a model gas comprising, by volume, CO: 0.65%, $C_3H_6$: 3000 ppm C, NO: 1500 ppm, $O_2$: 0.7%, $H_2O$: 3%, $CO_2$: 10%, $N_2$: remainder. The gas flow rate was 15 L/min, and the SV was approximately 300,000 hours$^{-1}$.

The purification rate was measured, as shown in the graph of FIG. 1, by increasing the temperature to 150° C. at a temperature-elevating rate of 20° C./min (temperature increase), maintaining a temperature of 150° C. for 5 minutes (stabilization), and then increasing the temperature to 600° C. at 20° C./min (temperature increase) and holding it at 600° C. for 3 minutes, subsequently measuring the gas composition that had passed through the catalyst using an infrared spectrometer (manufacturer: Horiba, Ltd., Model: MEXA-6000FT) (purification rate measurement holding), and calculating the purification rate from the measured value using the following formula.

Purification rate (%)=(catalyst in gas concentration (vol %)−catalyst out gas concentration (vol %))/ catalyst in gas concentration (vol %)×100

(Results)

When the fired aluminum phosphate body powders obtained in Examples 1 to 3 and Comparative Examples 1 and 2 were measured with an X-ray diffractometer (manufacturer: Rigaku Corp., Model No. RINT), production of fired aluminum phosphate bodies each having a tridymite-type crystal structure was confirmed.

Graphs showing the results of evaluating the catalyst properties are shown in FIG. 1 and FIG. 2.

Using a catalyst relating to the invention, as shown in Examples 1 to 3 and the graph of FIG. 2, an $AlPO_4$ catalyst supporting Pd particles with a mean particle diameter of 0.50 nm to 2.0 nm at 0.50 wt % by impregnation surprisingly exhibited more excellent purification power, with a purification rate exceeding 80% ((a) to (c) in FIG. 2), compared to a conventional catalyst (Pd-supporting $Al_2O_3$) ((d) and (e) in FIG. 2) exhibiting a purification rate of about 78%, for NOx at 600° C. even after heat durability treatment.

Furthermore, as shown by Examples 1 to 3, Comparative Examples 1 and 2 and the graph in FIG. 3, the $AlPO_4$ catalysts supporting Pd particles with a mean particle diameter of less than 0.50 nm and greater than 2.0 nm by impregnation had significantly grown crystallite diameters exceeding about 40 nm ((d) and (e) in FIG. 3) even after heat durability treatment, and had larger particle diameters compared to the catalysts relating to the invention ((a) to (c) in FIG. 3).

As explained above, $AlPO_4$ catalysts supporting Pd particles with mean particle diameters of 0.50 nm to 2.0 nm according to a mode of the invention (Examples 1 to 3) maintained satisfactory catalytic activity even after heat durability treatment, compared to both $AlPO_4$ catalysts supporting Pd particles having a mean particle diameter of less than 0.50 nm or greater than 2.0 nm (Comparative Examples 1 and 2), and Pd-supporting $Al_2O_3$ catalysts (Comparative Examples 3 to 7). In addition, it was clear that the difference in performance between the catalysts according to a mode of the invention and catalysts of the comparative examples and prior art was significantly affected by the reduced grain growth on $AlPO_4$ as a result of the Pd particles having mean particle diameters of 0.50 nm to 2.0 nm.

INDUSTRIAL APPLICABILITY

Thus, the exhaust gas purification catalyst relating to the invention has satisfactory performance as an exhaust gas purification catalyst under low temperature conditions, even after heat durability treatment. The use of an oxidation catalyst according to the invention, therefore, is not limited to use as an exhaust gas purification catalyst, and the catalyst may be utilized for various purposes in a wide range of fields.

What is claimed is:

1. An exhaust gas purification catalyst comprising at least one platinum-group metal selected from the group consisting of Pt, Rh and Pd having a mean particle diameter of between 0.50 nm and 2.0 nm, supported on a tridymite-type fired aluminum phosphate body.

2. An exhaust gas purification catalyst according to claim 1, wherein the platinum-group metal is Pd.

3. An exhaust gas purification catalyst according to claim 1, wherein the loading weight of the platinum-group metal with respect to the fired body is 0.0001 wt % to 2.0 wt %.

4. A method for producing an exhaust gas purification catalyst, comprising the steps of:
    firing aluminum phosphate obtained from an aqueous solution prepared to a pH of 3.5 to 4.5, at a temperature of between 1000° C. and 1200° C. for 2 hours or longer, to obtain a fired aluminum phosphate body, and
    supporting at least one type of platinum-group metal selected from the group consisting of Pt, Rh and Pd having a mean particle diameter of between 0.50 nm and 2.0 nm on the fired aluminum phosphate body.

5. The method for producing an exhaust gas purification catalyst according to claim 4, wherein the platinum-group metal is Pd.

6. The method for producing an exhaust gas purification catalyst according to claim 4, wherein the loading weight of the platinum-group metal with respect to the fired body is 0.0001 wt % to 2.0 wt %.

* * * * *